United States Patent
Aliyev et al.

(10) Patent No.: US 9,617,355 B2
(45) Date of Patent: Apr. 11, 2017

(54) PROCESS FOR POLYMERISATION OF ETHYLENE

(75) Inventors: Vugar O. Aliyev, Riyadh (SA); Ali Saad Headan, Riyadh (SA); Jaiprakash Brijal Sainani, Baroda (IN)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 838 days.

(21) Appl. No.: 13/877,558

(22) PCT Filed: Oct. 4, 2011

(86) PCT No.: PCT/EP2011/004914
§ 371 (c)(1),
(2), (4) Date: Apr. 3, 2013

(87) PCT Pub. No.: WO2012/045426
PCT Pub. Date: Apr. 12, 2012

(65) Prior Publication Data
US 2013/0310245 A1  Nov. 21, 2013

(30) Foreign Application Priority Data

Oct. 7, 2010 (EP) .................................. 10075703

(51) Int. Cl.
| C08F 2/00 | (2006.01) |
| C08F 4/00 | (2006.01) |
| C08F 4/06 | (2006.01) |
| C08F 4/44 | (2006.01) |
| C08F 4/24 | (2006.01) |
| C08F 110/02 | (2006.01) |
| C08F 10/02 | (2006.01) |

(52) U.S. Cl.
CPC ............ C08F 10/02 (2013.01); C08F 110/02 (2013.01)

(58) Field of Classification Search
USPC ........ 502/167, 200; 526/106, 141, 147, 211, 526/217, 220, 236
See application file for complete search history.

(56) References Cited

U.S. PATENT DOCUMENTS

| 5,115,053 A | 5/1992 | Knudsen et al. |
| 5,576,262 A | 11/1996 | Denton |
| 5,750,816 A | 5/1998 | Araki et al. |
| 6,204,346 B1 | 3/2001 | Bergmeister et al. |
| 6,417,299 B1 * | 7/2002 | Ford ............... C08F 10/00 502/117 |
| 2010/0291334 A1 * | 11/2010 | Cann ............... C08F 10/00 428/36.9 |

FOREIGN PATENT DOCUMENTS

| EP | 0608447 A1 | 8/1994 |
| EP | 2106854 A1 | 10/2009 |
| WO | 0075203 A1 | 12/2000 |

OTHER PUBLICATIONS

Cann et al.; "Comparison of Silyl Chromate and Chromium Oxide Based Olefin Polymerization Catalysts"; Marcromol. Symp.; vol. 213; 2004; pp. 29-36.
International Search Report; International Application No. PCT/EP2011/004914; International Filing Date: Oct. 4, 2011; Date of Mailing: Nov. 14, 2011; 5 Pages.
Written Opinion of the International Searching Authority; International Application No. PCT/EP2011/004914; International Filing Date: Oct. 4, 2011; Date of Mailing: Nov. 14, 2011; 6 Pages.
Peacock; "Handbook of Polyethylene: Structures, Properties, and Applications"; 2000; 26 Pages.

* cited by examiner

*Primary Examiner* — Fred M Teskin
*Assistant Examiner* — Elizabeth Eng
(74) *Attorney, Agent, or Firm* — Cantor Colburn LLP

(57) ABSTRACT

The present invention is directed to a process for the production of high density polyethylene by polymerisation of ethylene in the presence of a supported chromium oxide based catalyst which is modified with an organic compound comprising oxygen and a nitrogen atom which is selected from the group consisting of saturated heterocyclic organic compounds with a five or six membered ring, amino esters and amino alcohols. Such organic compounds allow manufacturing of HDPE with increases molecular weight distribution and increased molecular weight.

6 Claims, No Drawings

PROCESS FOR POLYMERISATION OF ETHYLENE

CROSS REFERENCE TO RELATED APPLICATIONS

This application is a 371 of International Application No. PCT/EP2011/004914, filed Oct. 11, 2011, which claims priority to European Application No. 10075703.8, filed Oct. 7, 2010, both of which are hereby incorporated by reference in its entirety.

The present invention relates to a process for the polymerisation of ethylene in the presence of a supported chromium oxide based catalyst. The present invention typically relates to a method for producing high density polyethylene.

The production processes of LDPE, HDPE and LLDPE are summarised in "Handbook of Polyethylene" by Andrew Peacock (2000; Dekker; ISBN 0824795466) at pages 43-66. The catalysts can be divided in three different subclasses including Ziegler Natta catalysts, Phillips catalysts and single site catalysts. The various processes may be divided into solution polymerisation processes employing homogeneous (soluble) catalysts and processes employing supported (heterogeneous) catalysts. The latter processes include both slurry and gas phase processes.

The polymerisation of ethylene with supported chromium based catalysts is disclosed by Kevin Cann in "Comparison of silyl chromate and chromium oxide based olefin polymerisation catalysts" (Macromolecular Symp, 2004, 213, 29-36).

The chromium oxide based catalyst, which is commonly referred to in the literature as "the Phillips catalyst", can be obtained by calcining a chromium compound carried on an inorganic oxide carrier in a non-reducing atmosphere. The chromium oxide catalysis and the ethylene polymerisation with this specific catalyst are disclosed in "Handbook of Polyethylene" by Andrew Peacock at pages 61-64.

The silyl chromate catalyst consists of silylchromate (bis-triphenylsilyl chromate) absorbed on dehydrated silica and subsequently reduced with for example diethylaluminum ethoxide. The silylchromate catalysts are more expensive than chromium oxide catalysts.

Although similar in structure the oxo and triphenylsilyl chromate catalyst perform very differently in polymerisation reactions. Silylchromate-based catalysts generally produce desirable polyethylenes relative to those produced by chromium oxide-type catalysts. Silylchromate produced polyethylenes generally have a broader molecular weight distribution than those produced using chromium oxide-type catalysts. The broader molecular weight distribution leads to better processability of the resulting polyethylene whereas the productivity of polymerisations with silylchromate-based catalysts is relatively low in comparison with chromium oxide-based catalysts.

Silica based chromium oxide catalysts result in good production rates however certain applications require a broader molecular weight distribution.

WO 00/75203 discloses a process for producing ethylene/olefin interpolymers involving contacting ethylene and at least one other olefin under polymerisation conditions with an olefin polymerisation catalyst and at least one modifier comprising at least one element from Group 15 and/or Group 16 of the Periodic Table of Elements.

An object of the present invention is to provide a process for the manufacturing of polyethylene, preferably high density polyethylene, in the presence of a chromium oxide based catalyst wherein the polymer molecular weight and the molecular weight distribution can be varied.

Another object of the present invention is to provide a process for the manufacturing of polyethylene, preferably high density polyethylene, in the presence of a chromium oxide based catalyst wherein the polymer has a high molecular weight and broad molecular weight distribution comparable to polyethylene produced based on silylchromate type catalyst.

Another object of the present invention is to provide a high density ethylene polymerisation process in the presence of a chromium oxide based catalyst wherein the molecular weight and the molecular weight distribution (MWD) of the ethylene polymer can be varied while maintaining acceptable values for the other essential features for example catalyst activity and polymer yield.

Another object of the present invention to provide a process for the manufacturing of polyethylene having a higher productivity in comparison with a process process for the manufacturing of polyethylene based on a silylchromate type catalyst.

The present invention provides a process wherein high density ethylene polymer is obtained by polymerizing ethylene in the presence of a supported chromium oxide based catalyst which is modified with an organic compound comprising an oxygen and a nitrogen atom. As used herein the organic compound comprising an oxygen and a nitrogen atom is also referred to as "catalyst modifier" both expressions having the same meaning.

The organic compound comprising an oxygen and a nitrogen atom, i.e. the catalyst modifier, has the function of an electron donor. This function is obtained by the availability of a lone pair of electrons wherein a lone pair—as will be understood by the skilled person—means a valence electron pair which is not bonded to other atoms.

The organic compound comprising oxygen and a nitrogen atom is a saturated heterocyclic organic compound with a five or six membered ring, an amino ester or an amino alcohol.

According to a preferred embodiment of the invention the oxygen and nitrogen containing organic compound is a saturated heterocyclic organic compound with a five or six membered ring, i.e. a ring consisting of 5 or 6 carbon atoms.

Suitable examples of a saturated heterocyclic organic compound with a five or six membered ring include imidazolidine, pyrazolidine, oxazolidine, 2-pyrrolidone, thiazolidine, 3-cyclohexyl-4,6-dimethyl-1,3-oxazinane, 2-oxazolidone or trioxane.

According to another preferred embodiment of the invention the oxygen and nitrogen containing compound is an amino ester.

Preferably the amino ester has the following formula:

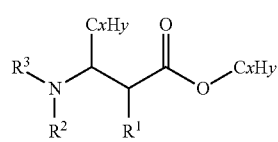

wherein
R$^1$=a C$_1$-C$_8$ alkyl group, a C$_1$-C$_8$ cyclo alkyl group or C$_6$-C$_{10}$ aryl group
R$^2$=hydrogen or a C$_1$-C$_8$ alkyl group
R$^3$=a C$_1$-C$_8$ alkyl group, C$_6$-C$_{10}$ aryl group or C$_3$-C$_8$ cycloalkyl group and x and y may independently of one other be the same or different and range between 1 and 10, provided that each carbon atom has four bonds, i.e. that the CxHy group is free of radicals.

In the formula above the $C_xH_y$ groups may be the same or different. In a preferred embodiment $C_xH_y$ is a methyl, ethyl, propyl, iso-propyl, butyl, sec-butyl, iso-butyl, pentyl or heptyl group.

Preferably $R^2$=hydrogen.

Suitable examples of the amino ester include ethyl 2-isopropyl-3-(isopropylamino)butanoate, ethyl 3-(cyclohexylamino)-2-(1-methylethyl)butanoate, ethyl 2-isopropyl-3-(methylamino)butanoate and/or methyl 2-cyclopentyl-3-(methylamino)butanoate.

According to a further preferred embodiment of the invention the oxygen and nitrogen containing organic compound is an amino alcohol.

Preferably the amino alcohol has the formula:

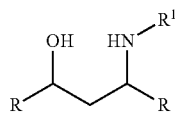

wherein
the R groups may be the same or different and be a $C_1$-$C_8$ alkyl group, $C_6$-$C_{10}$ aryl group, $C_1$-$C_8$ cycloalkyl group or trifluoromethyl group $R^1$ is a $C_1$-$C_8$ alkyl group, $C_3$-$C_8$ cycloalkyl group, $C_4$-$C_{16}$ alkyl substituted cycloalkyl group, $C_6$-$C_{10}$ aryl group Suitable examples of the amino alcohol include 4-(cyclohexylamino) pentan-2-ol, 4-(methylamino)pentan-2-ol, 4-(phenylamino)pentan-2-ol, 4-(isopropylamino)pentan-2-ol, 3-(methylamino)-1-phenylbutan-1-ol, 1,1,1-trifluromethyl-4-(methylamino) pentan-2-ol and 4-[(2-methylcyclohexyl)amino]pentan-2-ol.

In an embodiment of the present invention two or more different organic compounds comprising an oxygen and nitrogen atom may be used simultaneously.

According to a preferred embodiment of the invention the supported chromium oxide based catalyst is modified with an organic compound comprising an oxygen and a nitrogen compound and with an organoaluminum compound.

Preferably the organoaluminum compound has the general formula $R^1_nAlX_{3-n}$ wherein $R^1$ represent an alkyl group having from 1 to 10 carbon atoms, X represents halogen atom and $1 \leq n \leq 3$.

Preferably the halogen atom is Cl.

Suitable examples of the organoaluminum compound include for example trimethylaluminum, triethylaluminum, triisobutylaluminum, tri-n-hexylaluminum, ethylaluminum dichloride, ethylaluminum sesquichloride and/or diethylaluminum chloride.

Preferably triisobutylaluminum and/or diethylaluminum chloride are applied.

The combination of the supported chromium oxide based catalyst and the catalyst modifier (the organic compound comprising an oxygen and a nitrogen atom), optionally with the alkyl aluminum compound allows production of polyethylene having a broader MWD.

Furthermore the combination of the chromium catalyst and the catalyst modifier may result in a high productivity of the high density ethylene polymerisation process. In particular for low chromium to catalyst modifier ratios the activity of the catalyst is higher compared to non-modified chromium oxide catalyst. The present inventors have further found that the modified chromium oxide catalyst enables production of polyethylene with an increased high molecular weight shoulder when compared to polyethylene produced with chromium oxide catalyst in the absence of a modifier. An increased high molecular weight shoulder corresponds to a higher Mz/Mw value. A broad molecular weight distribution with the high-molecular-tail shoulder in the MWD is believed to be a key macro structural feature of the polymer that allows high impact resistance, good bubble stability, high ESCR (Environmental Stress Cracking Resistance), high PENT (Pennsylvania Notched Tensile) values, and good melt strength. The PENT test is a universal test for slow crack growth in plastic materials. High density polyethylene (HDPE) resins are increasingly being used for the manufacture of pipes and there is a continued need for the development of PE resins having increased resistance to stress cracking in order to extend the long-term durability of pipes produced therefrom. Field experience has shown that pipe failures are often the result of slow crack growth and/or failure caused by sudden impact by a heavy load. As a result, slow crack growth (SCG) resistance and rapid crack propagation (RCP) tests have been developed and are used to differentiate performance of PE pipe resins. SCG resistance is determined using the so-called PENT (Pennsylvania Notched Tensile) test. The latter test was developed by Professor Brown at Pennsylvania University and has been adopted as ASTM F 1473-94.

Preferably the oxygen and nitrogen containing organic compound is an amino alcohol. The present inventors have found that an amino alcohol, when compared to other catalyst modifiers, results in higher catalytic activity and broader molecular weight distribution.

Another advantage of the process according to the present invention is that the obtained products show properties similar to the properties of products obtained with the silylchromate on silica catalyst.

Furthermore bimodal HDPE polymers with broad MWD can be produced with the modified chromium based catalyst according to the invention. The chromium oxide based catalyst contains a support. Preferably the support is a silica support. The silica may have a surface area (SA) larger than 150 m²/g and a pore volume (PV) larger than 0.8 cm³/g. The support may be modified so as to include cogels such as for example silica-titania or silica-alumina and by the replacement of silica by alumina or amorphous aluminium phosphates. Furthermore, the support may comprise a tergel which is produced by mixing a chromium source with the silica and titanium compound. The chromium containing catalyst may also be doped with chemical compounds containing for example aluminium, titanium, phosphorus, boron or fluor. Doping may be carried out for example by impregnation of the porous chromium containing supports with a solution of any one of these compounds.

The terms cogel and tergel are known in the art and for example disclosed in U.S. Pat. Nos. 6,204,346, 5,576,262 and 5,115,053.

A chromium source is to be understood to mean any chromium containing compound capable of reacting with the surface hydroxyl groups of the silica-based supports. Chromium acetate is a preferred chromium source.

Preferably, the catalyst is a pure silica supported chromium based catalyst having a pore volume larger than 0.8 cm³/g and a specific surface area of at least 150 m²/g.

The properties of the silica such as pore volume and specific surface area are determined before the chromium is deposited on the silica and before activation at an elevated temperature.

The amount of chromium in the supported catalyst is generally at least 0.1% by weight. Generally the amount of chromium in the supported catalyst ranges between 0.1 and 5.0% by weight. Preferably the amount of chromium is at least 0.3% by weight, more preferably at least 0.5% by weight. Preferably the amount of chromium in the supported catalyst ranges between 0.5 and 2.0% by weight.

The average particle size ($D_{50}$) of the catalyst may range between for example 15 and 150 micrometers. The catalyst is activated before being applied in the polymerisation reaction. The activation may take place under different conditions. The activation takes place at an elevated temperature, for example, at a temperature above 450° C. The activation may take place in different atmospheres, for example in dry air. The activation takes place at least partially under an inert atmosphere preferably consisting of nitrogen. At the same time the temperature is raised slowly. It has been found to be advantageous to change from the nitrogen atmosphere to an atmosphere of dry air at a temperature of at most 700° C. The activation time after reaching the maximum temperature may last for several minutes to several hours. A preferred activation time is at least 1 hour but it may be advantageous to activate during a longer time. The resulting catalyst contains at least a portion of chromium in hexavalent state.

The molar ratio chromium to catalyst modifier, meaning the moles chromium divided by the moles catalyst modifier, ranges between 1:0.05 and 1:3, i.e. between 20 and 0.33.

Preferably, the molar ratio chromium to catalyst modifier ranges between 1:0.1 and 1:1, i.e. between 10 and 1.

In case the amount of the oxygen and nitrogen containing organic compound is too low no effects are observed.

In case that the amount of the oxygen and nitrogen containing organic compound is too high the catalyst will deactivate. The present inventors observed that electron donating compounds, such as the catalyst modifiers disclosed herein reduce the activity of the catalyst when added to the catalyst in relatively high amounts.

In the preferred embodiment where the supported chromium oxide based catalyst is modified with a catalyst modifier and with an organoaluminum compound, the molar ratio of chromium to aluminium, meaning the moles of chromium divided by the moles of aluminium ranges between 1:0.1 and 1:1, i.e. between 10 and 1.

The polymerisation takes place in a single reactor.

The polymerisation may be performed via a gas phase process, via a slurry process or a solution polymerisation.

Preferably, the polymerisation takes place via a slurry process. The catalyst of this invention is particularly suitable in slurry polymerizations for the production of high melt index polymers. The present inventors have observed that the use of hydrogen to control molecular weight and molecular weight distribution is not required.

In slurry reactors, a low boiling hydrocarbon solvent such as isobutane, hexane or heptane is employed as a continuous medium, and monomer, catalyst etc added to this continuous phase. The polymer formed is insoluble in the reaction medium, producing slurry of polymer and catalyst. Slurry reactors may be divided into loop reactors and boiling solvent reactors. Heat is at least partially removed by the heat of vaporization of solvent, which is later condensed and returned to the reactor. Polymer is removed as slurry from the bottom of the reactor and flashed to remove solvent, which is recycled. Slurry loop reactors may be horizontally or vertically oriented. Slurry flow is achieved by pumps which maintain the polymer slurry at relatively high velocity. Product is removed either continuously or discontinuously from a "settling leg". Preferably, the polymerisation of ethylene takes place in a diluent at a temperature of between 80° C. and 110° C. Suitable diluents include, for example, isobutane and isopentane.

In the case of the production of an ethylene copolymer the alpha olefin co monomer may be propylene, 1-butene, 1-pentene, 4-methyl-1-pentene, 1-hexene and/or 1-octene.

Preferably, the olefin polymerisation catalyst is prepared by pre contacting the supported activated chromium oxide based catalyst with the catalyst modifier before introducing the catalyst into the reactor.

The supported catalyst may be obtained by mixing the activated chromium oxide catalyst with the catalyst modifier(s) alone and/or their mixture with aluminum alkyls and then heating the mixture at an elevated temperature.

While active catalysts can be prepared by a variety of procedures, it is preferred to react catalyst modifier(s) with aluminum alkyls preferably in the presence of an inert organic solvent.

Next, this solution is added to the chromium oxide catalyst. The specified electron donors may be used individually, or in combination with one another. Preferably the catalyst modifier is soluble in an aliphatic or an aromatic hydrocarbon solvent so that the desired modification of the catalyst can be facilitated by treating the catalyst with a solution of the modifier in one or more of such solvent.

Suitable solvents which may be used for the deposition of the modifiers on the supported chromium-based catalyst include saturated aliphatic hydrocarbons, such as hexane, heptane, pentane, isopentane, isooctane and purified kerosene, saturated cycloaliphatic hydrocarbons, such as cyclohexane and cyclopentane, dimethylcyclopentane, aromatic hydrocarbons such as benzene, toluene, and xylene and chlorinated hydrocarbons, such as chlorobenzene, tetrachloroethylene and ortho-dichlorobenzene. Preferred solvents are cyclohexane, isopentane, hexane, heptane and toluene.

The heating of the activated chromium oxide-containing catalyst in the presence of electron donors alone and/or their mixture with aluminum alkyls takes place at a temperature preferably not exceeding 85° C. The temperature may range between 30 and 85° C. and preferably between 45 and 85° C. Heating is conducted for a period of time in the range between 5 minutes to 3 hours and preferably in the range between 5 minutes to 2 hours.

The HDPE powder obtained with the process according to the present invention has:
  a high-load melt index (HLMI)≥0.1 g/10 min and ≤50 g/10 min (according to ISO 1133)
  $M_w/M_n$≥10 and ≤100 (according to size exclusion chromatography (SEC) measurement)
  a density≥945 kg/m³ and ≤965 kg/m³ (according to ISO1183).

The ethylene polymers obtained with the process according to the invention may be combined with additives such as for example lubricants, fillers, stabilisers, antioxidants, compatibilizers and pigments. The additives used to stabilize the polymers may be, for example, additive packages including hindered phenols, phosphites, UV stabilisers, antistatics and stearates.

The ethylene polymers may be extruded or blow-moulded into articles such as for example pipes, bottles, containers, fuel tanks and drums, and may be extruded or blown into films.

The invention will be elucidated by means of the following non-limiting examples.

EXAMPLES

The properties of the polymers produced in the Examples were determined as follows:
Flow Index:
 Melt Index (2.16): ASTM D-2338 Condition E measured at 190° C. reported as grams per 10 minutes.
 Flow Index: ($FI_{21}$) ASTM D-1238 Condition F measured at 190° C. using 10 times the weight as used in Melt Index above.
 MFR: melt flow ratio is the flow index/melt index
Density:
 The polymer density (g/cm³) was determined as specified in ASTM D 1505-68.
Gel Permeation Chromatography (GPC):
 Polymer molecular weight and its distribution (MWD) were determined by Polymer Labs 220 gel permeation chromatograph. The chromatograms were run at 150° C. using 1,2,4-trichlorobenzene as the solvent with a flow rate of 0.9 ml/min. The refractive index detector is used to collect the signal for molecular weights. The software used is Cirrus from PolyLab for molecular weights from GPC. The calibration of the HT-GPC uses a Hamielec type calibration with broad standard and fresh calibration with each sample set.

Examples I-XII and Comparative Examples A-B

Catalyst Preparation

A silica supported chromium oxide based catalyst with 0.5% by of chromium, 4% by weight of titanium, a surface area of 300 m²/g and a pore volume of 1.5 cm³/g was activated in an atmosphere of dry air at a temperature of 825° C. for 3 hours using a tube furnace.

2.5 grams of previously activated catalyst was placed in a 50 ml flask. Dry degassed hexane was added in an amount just enough to obtain a slurry. The hydrocarbon solution comprised catalyst modifier, diethylaluminum chloride (DEAC) or tri isobutylaluminum (TIBAL) was added via syringe in a molar ratio as indicated in Table 1. Then the mixture was reacted for 1 hour at 50° C. with occasional shaking of the flask. The slurry was then dried under high vacuum or with a nitrogen purge. The modified catalyst was stored under nitrogen away from light until used.

Ethylene Polymerization

An autoclave with a volume of 2 liters was purged with nitrogen at 150° C. for 20 minutes. After cooling the autoclave to 90° C., one liter of isopentane was introduced to the reactor and then the reactor was pressurized up to 15 bar with ethylene. Then 0.15 ml of TEAL solution (1M) was injected into the reactor to scavenge the impurities that could deactivate the catalyst, followed by 0.30 g of the solid catalyst according to any one of the Examples I-XII and Comparative Examples A-B slurried in 20 ml of isopentane. The reactor temperature was raised to 102° C. Ethylene polymerization was carried out for 1 hour, with ethylene supplied on demand to maintain the total reactor pressure at 15 bars. Upon completion of the polymerization, the reactor was vented and cooled to ambient temperature to recover the polymer.

Table 1 below compares the catalyst productivity for the catalysts according to Examples I-XII and Comparative Examples A and B.

TABLE 1

| Example | Catalyst Modifier (M) | Cr/M/Al molar ratio | Productivity (gPE/gCat/hr) |
|---|---|---|---|
| I | ethyl 2-isopropyl-3-(isopropylamino) butanoate + DEAC | 1/0.25/0.5 | 370 |
| II | 2-pyrrolidone + DEAC | 1/0.25/0.5 | 927 |
| III | 2-pyrrolidone + DEAC | 1/0.5/1 | 333 |
| IV | 2-pyrrolidone + TIBAL | 1/0.35/0.5 | 570 |
| V | 2-pyrrolidone + TIBAL | 1/0.25/0.5 | 917 |
| VI* | 2-pyrrolidone | 1/0.75/0 | 387 |
| VI-a | 2-pyrrolidone | 1/0.75/0 | 760 |
| VII | 2-pyrrolidone + ethyl 2-isopropyl-3-(isopropylamino)butanoate + TIBAL | 1/0.125/0.125/0.5 | 800 |
| VIII | 3-cyclohexyl-4,6-dimethyl-1,3-oxazinane + DEAC | 1/0.25/0.5 | 943 |
| IX* | 3-cyclohexyl-4,6-dimethyl-1,3-oxazinane | 1/0.75/0 | 150 |
| IX-a | 3-cyclohexyl-4,6-dimethyl-1,3-oxazinane | 1/0.75/0 | 405 |
| X | 2-oxazolidone + DEAC | 1/0.44/0.44 | 1143 |
| XI | 4-(cyclohexylamino)pentan-2-ol | 1/0.75/0 | 1011 |
| XII | 4-[(2-methylcyclohexyl)amino]pentan-2-ol | 1/0.75/0 | 859 |
| A | none | — | 950 |
| B | TIBAL | 1/0/0.5 | 1350 |

With respect to examples VI* and IX* the present inventors observed an unexpected low productivity and suspected the catalyst was contaminated. The experiments were repeated, see VI-a and IX-a and the results show higher productivities confirming the suspected contamination of the catalyst.

The Table 1 above shows that in comparison to a process where no catalyst modifier was used, i.e. Comparative Example A the productivity of the catalyst is still at an acceptable level. Comparative example B in fact is a modified catalyst as it is modified with TIBAL (tri-isobutylaluminium). Because of this modification the productivity is relatively high.

Table 2 below summarises the polyethylene properties that were obtained with the catalysts according to examples I to XII and comparative examples A and B.

TABLE 2

|  | Bulk density (g/cm³) | Mw | Mn | MWD (—) |
|---|---|---|---|---|
| I | 0.27 | 356357 | 9124 | 39 |
| II | 0.30 | 250080 | 8329 | 30 |
| III | 0.29 | 312127 | 7583 | 41.2 |
| IV | 0.35 | 268632 | 9360 | 28.7 |
| V | 0.37 | 246232 | 10227 | 24 |
| VI* | — | — | — | — |
| VI-a | 0.34 | 335067 | 9256 | 36.2 |
| VII | 0.33 | 190960 | 19925 | 9.8 |
| VIII | 0.30 | 221252 | 8626 | 25.6 |
| IXI* | 0.35 | 266343 | 9758 | 27.3 |
| IXI-a | — | — | — | — |
| X | 0.34 | 310676 | 10320 | 30.1 |
| XI | 0.42 | 302873 | 10858 | 27.9 |
| XII | 0.40 | 336908 | 9880 | 34.1 |
| A | 0.31 | 192397 | 11803 | 16.3 |
| B | 0.36 | 214484 | 15883 | 13.5 |

According to Table 2 the modification of chromium oxide based catalysts with the catalyst modifier according to the invention results in an increase of the molecular weight and molecular weight distribution. Example VII shows a MWD of 9.8 which is significantly lower compared to the other Examples and the Comparative Examples. The cause for this unexpected behaviour is not entirely clear. Without being bound by it, the present inventors suspect that the combined use of the two modifiers according to the invention in combination with tri-isobutylaluminium led to a narrowing of the diversity of the chromium active sites, which consequently resulted in a narrow MWD of the produced resin.

With respect to comparative example B it is noted that even though said catalyst shows a relative high catalyst activity, the MWD is significantly lower than the MWD of the polyethylenes produced with a modified catalyst according to the present invention. In addition, the Mw is lower than most of the polyethylenes produced with a modified catalyst according to the present invention To study the effect of the molar ratio of chromium to catalyst modifier experiments as described in Table 3 below were carried out.

TABLE 3

| Cr/M* molar ratio | Productivity (g PE/g cat/1 hr) | Bulk density (g/cm$^3$) | Polymer Density (g/cm$^3$) |
| --- | --- | --- | --- |
| No modifier | 1653 | 0.36 | 0.9521 |
| 1/0.5 | 1980 | 0.39 | 0.9549 |
| 1/1 | 895 | 0.36 | 0.9575 |
| 1/1.25 | 653 | 0.33 | 0.9583 |
| 1/1.5 | 290 | 0.30 | — |
| E | 530 | 0.39 | 0.9593 |

M*—2-Pyrrolidine

The modifier that was used was 2-Pyrrolidine.

Catalyst preparation was carried out in the same manner as for Examples I to XII.

The catalyst of comparative example E is a Silylchromate (S-2) catalyst and was prepared by placing 2.5 grams of previously dehydrated silica (600° C.) in a 50 ml flask. Then 30 ml of dry degassed isopentane was added into the flask. 83 mg silylchromate was added and the mixture was stirred for 1 hour at 50° C. Then diethyl aluminum ethoxide was added via syringe to give an Al/Cr molar ratio of 2:1. Then slurry was dried under high vacuum or with a nitrogen purge. The chromium loading was 0.27 wt %.

The polymerisation conditions were as follows:

An autoclave with a volume of 2 liter was purged with nitrogen at 150° C. for 20 minutes. After cooling the autoclave to 90° C., one liter of isopentane was introduced to the reactor and then the reactor was pressurized up to 290 psi with ethylene. Then 1M solution of triethyl aluminum (TEAL), just enough to scavenge unwanted catalyst poisons such as oxygen and moisture, were added to the reactor. After that, the catalyst slurried in isopentane was injected into the reactor. The reactor temperature was raised to 102° C. Ethylene polymerization was carried out for 1 hour, with ethylene supplied on demand to maintain the total reactor pressure at 20 bar. Upon completion of the polymerization, the reactor was vented and cooled to ambient temperature to recover the polymer.

From Table 3 it is clear that upon increasing ratio of Cr/M, meaning from 1/1.5 to 1/0.5, the productivity increases. Said in another way, at lower relative modifier levels the productivity increases.

The inventors further studied the effect of the molar ratio of chromium to catalyst modifier on the molecular weight and molecular weight distribution, the results of which can be found it Table 4.

TABLE 4

| Cr/M* molar ratio | Mw | Mn | MWD | Mz + 1 | Mz |
| --- | --- | --- | --- | --- | --- |
| No modifier | 190069 | 11733 | 16.2 | 1647090 | 949438 |
| 1/0.5 | 212298 | 9258 | 22.9 | 2488233 | 1243931 |
| 1/0.75 | 258821 | 8366 | 30.9 | 3320769 | 1681422 |
| 1/1 | 302120 | 8549 | 35.3 | 3409073 | 1841619 |
| 1/1.25 | 351947 | 9285 | 37.9 | 3645504 | 1930072 |
| E | 313985 | 8928 | 35.1 | 3502230 | 1967113 |

M*—2-Pyrrolidone

From Table 4 it is clear that compared to the "no modifier" example a catalyst modifier allows the molecular weight distribution and molecular weight to be varied, more specifically to be broadened and increased respectively. When compared to Comparative Example E it is further clear that the invention enables production of a polyethylene which has similar molecular weight and molecular weight distribution as silylchromate catalyst based produced polyethylene.

In addition the present inventors studied the effect of the molar ratio of chromium to catalyst modifier on the productivity, bulk density, flow index and polymer density for the catalyst modifier 4-(cyclohexylamino)pentan-2-ol. The results of can be found it Table 5.

TABLE 5

| Cr/M** molar ratio | Productivity (g PE/g cat/1 hr) | Bulk density (g/cm$^3$) | FI | Density (g/cm$^3$) |
| --- | --- | --- | --- | --- |
| No modifier | 1653 | 0.36 | 1.57 | 0.9521 |
| 1/0.5 | 2160 | 0.44 | 2.39 | 0.9554 |
| 1/1 | 1180 | 0.40 | 3.4 | 0.9565 |
| 1/1.25 | 814 | 0.34 | 1.25 | 0.9589 |
| 1/1.5 | 354 | 0.30 | 0.69 | — |
| E | 530 | 0.39 | 1.17 | 0.9593 |

M**—4-(cyclohexylamino)pentan-2-ol

The results of the experiments were in line with the experiments carried out for catalyst modifier 2-pyrrolidone in Table 3.

From Table 5 it is clear that upon increasing ratio of Cr/M, meaning from 1/1.5 to 1/0.5, the productivity increases.

The inventors further studied the effect of the molar ratio of chromium to catalyst modifier on the molecular weight and molecular weight distribution, the results of which can be found it Table 6.

TABLE 6

| Cr/M** molar ratio | Mw | Mn | MWD | Mz + 1 | Mz |
| --- | --- | --- | --- | --- | --- |
| No modifier | 190069 | 11733 | 16.2 | 1647090 | 949438 |
| 1/0.5 | 218438 | 12859 | 17 | 2671117 | 1244475 |
| 1/1 | 286565 | 7980 | 35.9 | 4255635 | 2079459 |
| 1/1.25 | 316905 | 8505 | 37.4 | 4329903 | 2232212 |
| 1/1.5 | 361584 | 9144 | 39.5 | 3819371 | 2182846 |
| E | 313985 | 8928 | 35.1 | 3502230 | 1967113 |

M**—4-(cyclohexylamino)pentan-2-ol

From Table 6 it is clear that compared to the "no modifier" example a catalyst modifier allows the molecular weight distribution and molecular weight to be varied, more specifically to be broadened and increased respectively. When compared to Comparative Example E it is further clear that the invention enables production of a polyethylene which has similar molecular weight and molecular weight distribution as silylchromate catalyst based produced polyethylene.

The invention claimed is:

1. A process for the production of high density polyethylene by polymerizing ethylene in the presence of a supported chromium oxide-based catalyst that is modified with an organic compound comprising an oxygen and a nitrogen atom, wherein the organic compound is an amino alcohol, wherein the amino alcohol has the formula:

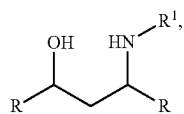

wherein each R, independently the same or different, is a $C_1$-$C_8$ alkyl group, a $C_6$-$C_{10}$ aryl group, a $C_1$-$C_8$ cycloalkyl group, or a trifluoromethyl group, and
$R^1$ is a $C_1$-$C_8$ alkyl group, a $C_3$-$C_8$ cycloalkyl group, a $C_6$-$C_{10}$ aryl group or a $C_4$-$C_{16}$ alkyl substituted cycloalkyl group.

2. The process according to claim 1, wherein the amino alcohol is 4-(cyclohexylamino) pentan-2-ol, 4-(methylamino)pentan-2-ol, 4-(phenylamino)pentan-2-ol, 4-(isopropylamino)pentan-2-ol, 3-(methylamino)-1-phenylbutan-1-ol, 1,1,1-trifluromethyl-4-(methylamino) pentan-2-ol and/or 4-[(2-methylcyclohexyl)amino]pentan-2-ol.

3. The process according to claim 1, wherein the molar ratio of chromium to amino alcohol ranges between 1: 0.05 and 1:3.

4. The process according to claim 1, wherein the supported chromium oxide based catalyst is modified with a mixture of the amino alcohol and an organoaluminum compound having the formula $R^1_n AlX_{3-n}$, wherein $R^1$ represents an alkyl group having from 1 to 10 carbon atoms, X represents a halogen atom and $1 \leq n \leq 3$.

5. The process according to claim 4, wherein the molar ratio of chromium to aluminium ranges between 1:0.1 and 1:1.

6. The process according to claim 1, wherein the process is a slurry process.

* * * * *